United States Patent
Ihara

(10) Patent No.: US 10,189,993 B2
(45) Date of Patent: Jan. 29, 2019

(54) SILOXANE COMPOSITION AND METHOD FOR PRODUCING SAME

(71) Applicant: SHIN-ETSU CHEMICAL CO., LTD., Tokyo (JP)

(72) Inventor: Toshiaki Ihara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/321,422

(22) PCT Filed: Jun. 4, 2015

(86) PCT No.: PCT/JP2015/066213
§ 371 (c)(1),
(2) Date: Dec. 22, 2016

(87) PCT Pub. No.: WO2015/198828
PCT Pub. Date: Dec. 30, 2015

(65) Prior Publication Data
US 2018/0072850 A1 Mar. 15, 2018

(30) Foreign Application Priority Data
Jun. 23, 2014 (JP) .................. 2014-128308

(51) Int. Cl.
*C08L 83/04* (2006.01)
*C08J 3/09* (2006.01)
*C08G 77/44* (2006.01)
*C08J 3/24* (2006.01)
*C08K 5/01* (2006.01)
*C08K 5/56* (2006.01)
*C08L 83/00* (2006.01)
*C08G 77/12* (2006.01)
*C08G 77/20* (2006.01)

(52) U.S. Cl.
CPC .............. *C08L 83/04* (2013.01); *C08G 77/44* (2013.01); *C08J 3/091* (2013.01); *C08J 3/24* (2013.01); *C08K 5/01* (2013.01); *C08K 5/56* (2013.01); *C08L 83/00* (2013.01); *C08G 77/12* (2013.01); *C08G 77/20* (2013.01)

(58) Field of Classification Search
USPC .................. 528/15, 31, 32; 525/477–478
See application file for complete search history.

(56) References Cited

U.S. PATENT DOCUMENTS

| 4,486,495 A * | 12/1984 | Matsushita ............. C08L 83/04 427/387 |
| 5,412,004 A | 5/1995 | Tachibana et al. |
| 6,727,338 B1 | 4/2004 | Kilgour et al. |
| 6,797,797 B2 * | 9/2004 | Takeo ......................... C08J 3/24 528/31 |
| 9,862,867 B2 * | 1/2018 | Gordon .................. C09J 183/06 |
| 2008/0058479 A1 | 3/2008 | Schlitzer et al. |
| 2009/0324652 A1 * | 12/2009 | Polonka ................... A61K 8/37 424/401 |
| 2011/0111217 A1 | 5/2011 | Kuroda et al. |
| 2012/0220549 A1 * | 8/2012 | Starch .................... A61K 8/895 514/63 |

FOREIGN PATENT DOCUMENTS

| GB | 1240520 A | 7/1971 |
| JP | 5-140320 A | 6/1993 |
| JP | 2005-343974 A | 12/2005 |
| JP | 2006-506508 A | 2/2006 |
| JP | 2010-502778 A | 1/2010 |

OTHER PUBLICATIONS

International Search Report (PCT/ISA/210) issued in PCT/JP2015/066213, dated Jul. 7, 2015.
Written Opinion (PCT/ISA/237) issued in PCT/JP2015/066213, dated Jul. 7, 2015.
Extended European Search Report, dated Jan. 11, 2018, for European Application No. 15812812.4.

* cited by examiner

*Primary Examiner* — Marc S Zimmer
(74) *Attorney, Agent, or Firm* — Birch, Stewart, Kolasch & Birch, LLP

(57) ABSTRACT

Provided are a siloxane composition, said siloxane composition showing physical properties between a dimethyl polysiloxane oil and a gelatinous crosslinked siloxane and being fluid or becoming fluid when dissolved in a solvent, and a method for producing the same.
The siloxane composition, which is obtained by subjecting specific starting organopolysiloxane materials to an addition reaction in a large excess (i.e., 8 times by mass or greater as much as the starting materials) of a solvent, comprises a crosslinked organopolysiloxane, said crosslinked organopolysiloxane having a weight-average molecular weight of 5,000-300,000,000 and containing 0.1-50 mol of silethylene bond per 1,000 mol of siloxane unit, dissolved in the solvent.

4 Claims, No Drawings

SILOXANE COMPOSITION AND METHOD FOR PRODUCING SAME

TECHNICAL FIELD

This invention relates to a siloxane composition that has flowability and exhibits physical properties intermediate to those of a dimethylpolysiloxane oil and a gel-like crosslinked siloxane, and to a method of producing the same.

BACKGROUND ART

Gel-like crosslinked organopolysiloxanes are used, for example, in cosmetics and in junction coatings for electrical wiring, but are all solid substances that lack flowability. Hence, they do not dissolve in solvents, and a long grinding operation is required to formulate them in cosmetics or resins.

Silicone oil dispersions of silicone gels are used in cosmetics. Such products are obtained by first creating a solid silicone gel via an addition reaction, and then grinding up the gel while dispersing it in a silicone oil. This production method is troublesome to carry out. Moreover, in the solid silicone gel, even if unreacted functional groups are present near the regions that have become solid due to the reaction, the reaction proceeds no further. As a result, the crosslink density differs each time that production is carried out-even using the same starting materials, thus making the physical properties difficult to control.

In plastics, a silicone oil or silicone gum having a high degree of polymerization is dispersed in the resin and used to increase the flowability during molding or for such purposes as to prevent blemishes or confer slip properties. Silicone oils with a low degree of polymerization have a flowability increasing effect and exhibit excellent slip properties, but because the silicone oil bleeds out onto the surface, the surface becomes slippery. Hence, gum-like silicones having a high degree of polymerization are used, but uniformly dispersing such silicones, such as by masterbatching beforehand, is troublesome to carry out. Also, because most of the silicone added gets buried within the resin, only a portion takes part in action at the surface, resulting in a poor efficiency. At the same time, when a solid silicone gel or resin is used, given the many ingredients that collect within the resin and their poor compatibility with the resin, dispersion is poor, which often lowers the mechanical strength. Moreover, the surface modifying effects are poor.

No methods for synthesizing compounds having physical properties intermediate to those of silicone gels and silicone oils have been reported in the literature.

Prior art relating to this invention includes the following document.

PRIOR ART DOCUMENT

Patent Document

Patent Document 1: JP-A H05-140320

SUMMARY OF THE INVENTION

Problems to be Solved by the Invention

In light of the above, an object of this invention is to provide a siloxane composition that exhibits physical properties intermediate to those of a dimethylpolysiloxane oil and a gel-like crosslinked siloxane, and either has flowability or exhibits flowability when dissolved in a solvent. Another object of the invention is to provide a method of producing the same.

Means for Solving the Problems

The inventor has conducted extensive investigations on crosslinked organopolysiloxanes. As a result, he has discovered that, by addition reacting specific starting materials in a large excess of solvent that is at least 8 times the weight of the starting materials, a siloxane composition that has flowability and exhibits physical properties intermediate to those of an oil and a gel can be stably produced.

Accordingly, the invention provides the following siloxane and method of preparation thereof.

[1] A siloxane composition comprising a crosslinked organopolysiloxane dissolved in a solvent, which crosslinked organopolysiloxane has a weight-average molecular weight of 5,000 to 300,000,000, contains 0.1 to 50 moles of silethylene linkages per 1,000 moles of siloxane units, and is obtained by hydrosilylation of an organopolysiloxane having a structure of formula (1) below with an organohydrogenpolysiloxane having a structure of formula (2) below

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by $-(CH_2)_a-CH=CH_2$ (where "a" is 0 or an integer from 1 to 6); and α, β, γ, δ, ε, ζ, η, θ, ι, κ, λ, μ and ν are each independently 0 or a positive number, with the provisos that β, δ and ζ are not all 0, β+δ+ζ≥2, ι, λ and ν are not all 0, and ι+λ+ν≥2) in an amount of solvent that is at least 8 times the combined weight of the polysiloxanes of formulas (1) and (2) and using a platinum group metal compound.

[2] The siloxane composition of [1] wherein, in formula (1), 1≤α+γ+ε+η≤1,000 and, in formula (2), 1≤θ+κ+μ≤200.

[3] The siloxane composition of [2] wherein, in formula (1), 1≤γ≤1,000 and, in formula (2), 1≤κ≤200.

[4] The siloxane composition of any one of [1] to [3], wherein the solvent includes an organic solvent selected from among toluene, hexane, xylene and methyl ethyl ketone.

[5] The siloxane composition of any one of [1] to [3], wherein the solvent is an organosiloxane selected from among octamethyltetrasiloxane, decamethylpentasiloxane, linear siloxanes of the formula $M_2D_n$ (M denoting an $R_3SiO_{1/2}$ unit and D denoting an $R_2SiO_{2/2}$ unit, where each R is independently an unsubstituted or substituted monovalent hydrocarbon group of 1 to 12 carbon atoms that has no aliphatic unsaturated bonds; and n being an integer from 0 to 200), and branched siloxanes of the formula $M_{2+m}D_nT_m$ (M, D and n being the same as above; T denoting an $RSiO_{3/2}$ unit, where R is the same as above; and m being an integer from 1 to 10).

[6] A siloxane composition comprising the crosslinked organopolysiloxane of any one of [1] to [3] dissolved in an organopolysiloxane of formula (3) below

(wherein M is $R_3SiO_{1/2}$, $M^{Vi}$ is $R_2PSiO_{1/2}$, D is $R_2SiO_{2/2}$, $D^{Vi}$ is RPSiO$_{2/2}$, T is RSiO$_{3/2}$ and $T^{Vi}$ is PSiO$_{3/2}$, each R being independently an unsubstituted or substituted monovalent hydrocarbon group of 1 to 12 carbon atoms that has no aliphatic unsaturated bonds and P being an alkenyl group represented by —(CH$_2$)$_a$—CH=CH$_2$ (where "a" is 0 or an integer from 1 to 6); and α', β', γ', δ', ε' and ζ' are each independently 0 or a positive number, with the proviso that α'+β'+γ'+δ'+ε'+ζ'≤200), wherein the content of the organopolysiloxane of formula (3) is from 0.1 to 40 times the weight of the crosslinked organopolysiloxane.

[7] The siloxane composition of any one of [1] to [6] which, when 30 wt % of the crosslinked organopolysiloxane is dissolved in a dimethylpolysiloxane having a kinematic viscosity of 20 mm$^2$/s (25° C.), has a viscosity at 25° C. of from 100 to 2,000,000 mPa·s.

[8] The siloxane composition of any one of [1] to [7] which, when 30 wt % of the crosslinked organopolysiloxane is dissolved in toluene, has a viscosity at 25° C. of from 50 to 1,000,000 mPa·s.

[9] The siloxane composition of any one of [1] to [8], wherein the organopolysiloxane of formula (1) has a weight-average molecular weight of 260 to 74,874 and the organohydrogenpolysiloxane of formula (2) has a weight-average molecular weight of 208 to 15,414.

[10] The siloxane composition of any one of [1] to [9], wherein the remaining amount of SiH groups, as calculated from the amount of hydrogen gas generated when alkali is added, is not more than 0.001 mol/100 g.

[11] A method of preparing a siloxane composition, comprising the step of producing a crosslinked organopolysiloxane having a weight-average molecular weight of 5,000 to 300,000,000 and containing 0.1 to 50 moles of silethylene linkages per 1,000 moles of siloxane units by hydrosilylation of an organopolysiloxane having a structure of formula (1) below with an organohydrogenpolysiloxane having a structure of formula (2) below

 (1)

 (2)

(wherein M is $R_3SiO_{1/2}$, $M^{Vi}$ is $R_2PSiO_{1/2}$, D is $R_2SiO_{2/2}$, $D^{Vi}$ is RPSiO$_{2/2}$, T is RSiO$_{3/2}$, $T^{Vi}$ is PSiO$_{3/2}$, $M^H$ is $R_2$HSiO$_{1/2}$, $D^H$ is RHSiO$_{2/2}$, $T^H$ is HSiO$_{3/2}$ and Q is SiO$_{4/2}$, each R being independently an unsubstituted or substituted monovalent hydrocarbon group of 1 to 12 carbon atoms that has no aliphatic unsaturated bonds and P being an alkenyl group represented by —(CH$_2$)$_a$—CH=CH$_2$ (where "a" is 0 or an integer from 1 to 6); and α, β, γ, δ, ε, ζ, η, θ, ι, κ, λ, μ and ν are each independently 0 or a positive number, with the provisos that β, δ and ζ are not all 0, β+δ+ζ≥2, ι, λ and ν are not all 0, and ι+λ+ν≥2) in an amount of solvent that is at least 8 times the combined weight of the polysiloxanes of formulas (1) and (2) and using a platinum group metal compound.

[12] The method of preparing a siloxane composition of [11] which further comprises, after obtaining the crosslinked organopolysiloxane using an organic solvent selected from among toluene, hexane, xylene and methyl ethyl ketone as the solvent: adding a low-viscosity organopolysiloxane as a solvent, and distilling off the organic solvent by heating under reduced pressure so as to give a composition that contains no organic solvent.

[13] The method of preparing a siloxane composition of [12], wherein the low-viscosity organopolysiloxane is an organopolysiloxane of the following formula (3)

 (3)

(wherein M is $R_3SiO_{1/2}$, $M^{Vi}$ is $R_2PSiO_{1/2}$, D is $R_2SiO_{2/2}$, $D^{Vi}$ is RPSiO$_{2/2}$, T is RSiO$_{3/2}$ and $T^{Vi}$ is PSiO$_{3/2}$, each R being independently an unsubstituted or substituted monovalent hydrocarbon group of 1 to 12 carbon atoms that has no aliphatic unsaturated bonds and P being an alkenyl group represented by —(CH$_2$)$_a$—CH=CH$_2$ (where "a" is 0 or an integer from 1 to 6); and α', β', γ', δ', ε' and ζ' are each independently 0 or a positive number, with the proviso that α'+β'+γ'+δ'+ε'+ζ'≤200).

Advantageous Effects of the Invention

The siloxane composition of the invention, owing to its unprecedented physical properties, can exhibit novel characteristics in a variety of applications. Exemplary applications include silicone gels for use in cosmetics that have a soft feel and can be easily and inexpensively synthesized, molded bodies of siliconized plastic that are free of surface slipperiness, mist suppressants for suppressing mist generated during the high-speed application of silicones for release paper, and pressure-sensitive adhesives having excellent re-peelability.

EMBODIMENT FOR CARRYING OUT THE INVENTION

The siloxane composition of the invention includes a crosslinked organopolysiloxane and a solvent. The crosslinked organopolysiloxane of the invention is characterized by having a weight-average molecular weight of 5,000 to 300,000,000, containing 0.1 to 50 moles of silethylene linkages per 1,000 moles of siloxane units, and being obtained by hydrosilylation of an organopolysiloxane having a structure of formula (1) below with an organohydrogenpolysiloxane having a structure of formula (2) below in an amount of solvent that is at least 8 times the combined weight of the polysiloxanes of formulas (1) and (2) and using a platinum catalyst.

 (1)

 (2)

In formulas (1) and (2), M is $R_3SiO_{1/2}$, $M^{Vi}$ is $R_2PSiO_{1/2}$, D is $R_2SiO_{2/2}$, $D^{Vi}$ is RPSiO$_{2/2}$, T is RSiO$_{3/2}$, $T^{Vi}$ is PSiO$_{3/2}$, $M^H$ is $R_2$HSiO$_{1/2}$, $D^H$ is RHSiO$_{2/2}$, $T^H$ is HSiO$_{3/2}$ and Q is SiO$_{4/2}$, each R being independently an unsubstituted or substituted monovalent hydrocarbon group of 1 to 12 carbon atoms that has no aliphatic unsaturated bonds and P being an alkenyl group represented by —(CH$_2$)$_a$—CH=CH$_2$ (wherein "a" is 0 or an integer from 1 to 6). The subscripts α, β, γ, δ, ε, ζ, η, θ, ι, κ, λ, μ and ν are each independently 0 or a positive number, provided that β, δ and ζ are not all 0, β+δ+ζ≥2, ι, λ and ν are not all 0, and ι+λ+ν≥2.

First, the organopolysiloxane having a structure of formula (1) below and the organohydrogenpolysiloxane having a structure of formula (2) below are described.

 (1)

 (2)

In formulas (1) and (2), M, $M^{Vi}$, D, $D^{Vi}$, T, $T^{Vi}$, $M^H$, $D^H$, $T^H$ and Q respectively denote the following units.

M: $R_3SiO_{1/2}$,
$M^{Vi}$: $R_2PSiO_{1/2}$,
D: $R_2SiO_{2/2}$,
$D^{Vi}$: RPSiO$_{2/2}$,
T: RSiO$_{3/2}$,
$T^{Vi}$: PSiO$_{3/2}$, $M^H$: $R_2HSiO_{1/2}$,
$D^H$: $RHSiO_{2/2}$,
$T^H$: $HSiO_{3/2}$,
Q: $SiO_{4/2}$.

In these formulas, each R is independently an unsubstituted or substituted monovalent hydrocarbon group of 1 to 12 carbon atoms, and preferably 1 to 6 carbon atoms, which has no aliphatic unsaturated bonds. Illustrative examples include alkyl groups such as methyl, ethyl, propyl, butyl, pentyl, hexyl, octyl, decyl and dodecyl groups; cycloalkyl groups such as a cyclohexyl group; aryl groups such as phenyl, naphthyl and tolyl groups; and any of these groups in which some portion of the hydrogen atoms bonded to carbon atoms is substituted with halogen atoms, cyano groups, hydroxyl groups or the like. However, to lower the peel strength, it is preferable for at least 50 mol % of the total number of R groups to be methyl groups.

P is an alkenyl group represented by $-(CH_2)_a-CH=CH_2$ (wherein "a" is 0 or an integer from 1 to 6).

$\alpha, \beta, \gamma, \delta, \epsilon, \zeta, \eta, \theta, \iota, \kappa, \lambda, \mu$ and $\nu$ are each independently 0 or a positive number. Here, $\beta, \delta$ and $\zeta$ are not all 0; the sum $\beta+\delta+\zeta$ is 2 or more, preferably 2 to 10, and more preferably 2 to 5; $\iota, \lambda$ and $\nu$ are not all 0; and the sum $\iota+\lambda+\nu$ is 2 or more, preferably 2 to 10, and more preferably 2 to 5.

Also, $\alpha, \gamma, \epsilon$ and $\eta$ are not all 0 and, particularly from the standpoint of the content of silethylene linkages, the sum $\alpha+\gamma+\epsilon+\eta$ is preferably 1 to 1,000, more preferably 10 to 500, and even more preferably 50 to 400. Here, from the standpoint of the content of silethylene linkages, $\gamma$ in particular is preferably 1 to 1,000, more preferably 10 to 500, and even more preferably 50 to 400. In addition, $\alpha$ is preferably 0 to 20, more preferably 0 to 10, and especially 0 to 5; $\epsilon$ is preferably 0 to 50, and especially 0 to 10; and $\eta$ is preferably 0 to 5, and especially 0 to 1.

In addition, $\theta, \kappa$ and $\mu$ are not all 0 and, similarly, from the standpoint of the content of silethylene linkages, the sum $\theta+\kappa+\mu$ is preferably 1 to 200, more preferably 10 to 150, and even more preferably 20 to 100. Here, $\kappa$ is preferably 1 to 200, more preferably 10 to 150, and even more preferably 20 to 100; $\theta$ is preferably 0 to 20, more preferably 0 to 10, and especially 0 to 5; and $\mu$ is preferably 0 to 50, and especially 0 to 10.

The organopolysiloxane of formula (1) is an organopolysiloxane having at least 2, and preferably from 2 to 10, silicon-bonded alkenyl groups per molecule.

The weight-average molecular weight of this organopolysiloxane is preferably from 260 to 74,874, and more preferably from 408 to 7,586. When the weight-average molecular weight is too large, the gel may be soft and sticky, making it difficult to handle. Hence, the number of Q units is preferably 1 or less, and more preferably 0. Here and below, the weight-average molecular weight can be measured as the polystyrene-equivalent weight-average molecular weight by gel permeation chromatographic (GPC) analysis (solvent: toluene).

Specific examples of such organopolysiloxanes include siloxanes having alkenyl groups at both ends, siloxanes having alkenyl groups on side chains, siloxanes having alkenyl groups at one end and on side chains, and siloxanes having alkenyl groups at both ends and on side chains. Expressed in terms of structural formulas, examples include $M^{Vi}_2D_\gamma$, $M_2D_\gamma D^{Vi}_\delta$, $M^{Vi}_3D_\gamma T_1$, $M^{Vi}_4D_\gamma T_2$, $M^{Vi}_2D_\gamma D^{Vi}_\delta$, $M^{Vi}_2D_\gamma Q_1$ and $M_\alpha D_\gamma D^{Vi}_\delta T^{Vi}_\zeta$ (wherein $\gamma$ is 1 to 1,000, preferably 10 to 500, and especially 50 to 400; $\delta$ is 1 to 20, preferably 2 to 10, and especially 2 to 5; $\zeta$ is 1 to 20, preferably 1 to 10, and especially 1 to 6). More specific structural examples include $M^{Vi}_2D_{10}$, $M^{Vi}_2D_{100}$, $M_2D_{27}D^{Vi}_3$, $M_2D_{97}D^{Vi}_3$, $M_2D_{26}D^{Vi}_4$, $M_2D_{25}D^{Vi}_5$, $M_2D_{24}D^{Vi}_6$, $M_2D_{96}D^{Vi}_4$, $M_2D_{95}D^{Vi}_5$, $M^{Vi}_3D_{100}T_1$, $M^{Vi}_4D_{100}T_2$, $M^{Vi}_2D_{97}D^{Vi}_1$, $M^{Vi}_2D_{95}D^{Vi}_3$ and $M_3D_{93}D^{Vi}_3T^{Vi}_1$.

The vinyl group content is preferably from 0.001 to 1 mol/100 g, and more preferably in the range 0.01 to 0.1 mol/100 g.

The organohydrogenpolysiloxane of formula (2) has at least 2, and preferably 2 to 100, silicon-bonded hydrogen atoms (SiH groups) per molecule. The crosslinked organopolysiloxane is formed by an addition reaction between the SiH groups on this organohydrogenpolysiloxane and the vinyl groups on the organopolysiloxane of formula (1).

The weight-average molecular weight of the organohydrogenpolysiloxane is preferably from 208 to 15,414, and more preferably from 282 to 7,534. When the weight-average molecular weight is too small, the crosslink density becomes high, as a result of which gelling or solidification may occur; when the weight-average molecular weight is too large, the gel may be soft and sticky, making it difficult to handle.

Such organohydrogenpolysiloxanes are exemplified by siloxanes having hydrogen groups at both ends, siloxanes having hydrogen groups on side chains, siloxanes having hydrogen groups at one end and on side chains, and siloxanes having hydrogen groups at both ends and on side chains. Expressed in terms of structural formulas, examples include $M^H_2D_\kappa$, $M_2D^H_\lambda$, $M_2D_\kappa D^H_\lambda$, $M^H_2D_\kappa D^H_\lambda$, $M^H_3D_\kappa T_1$, $M^H_4D_\kappa T_2$ and $M_\theta D_\kappa D^H_\lambda T^H_\nu$ (wherein $\kappa$ is 1 to 200, preferably 10 to 150, and especially 20 to 100; $\lambda$ is 1 to 20, preferably 1 to 10, and especially 1 to 5; $\theta$ is 3 to 22, preferably 3 to 12, and especially 3 to 7; and $\nu$ is 1 to 20, preferably 1 to 10, and especially 1 to 6). More specific structural examples include $M^H_2D_{10}$, $M^H_2D_{100}$, $M_2D_{27}D^H_3$, $M_2D_{97}D^H_3$, $M_2D_{26}D^H_4$, $M_2D_{25}D^H_5$, $M_2D_{24}D^H_6$, $M_2D_{96}D^H_4$, $M_2D_{95}D^H_5$, $M^H_3D_{100}T_1$, $M^H_4D_{100}T_2$, $M^H_2D_{97}D^H_1$, $M^H_2D_{95}D^H_3$ and $M_3D_{93}D^H_3T^H_1$.

The SiH group content is preferably from 0.01 to 10 mol/100 g, and more preferably from 0.01 to 1 mol/100 g.

The organohydrogenpolysiloxane is used in an amount such that the molar ratio of SiH groups in the organohydrogenpolysiloxane to alkenyl groups in the organopolysiloxane of formula (1) (SiH groups:alkenyl groups) is preferably from 0.8:1 to 1.8:1, and more preferably from 0.9:1 to 1.6:1.

The crosslinked organopolysiloxane of the invention can be synthesized by using a platinum group metal catalyst to effect a hydrosilylation (addition) reaction between an organopolysiloxane having a structure of above formula (1) and an organohydrogenpolysiloxane having a structure of above formula (2) in an amount of solvent that is at least 8 times, preferably at least 10 times, and more preferably at least 12 times, the combined weight of the polysiloxanes of formulas (1) and (2). This is a reaction that adds SiH groups in the organohydrogenpolysiloxane having a structure of formula (1) to vinyl groups in the organopolysiloxane having a structure of formula (2) by means of a platinum group metal catalyst.

Here, known catalysts that are used as addition reaction catalysts may be employed as the platinum group metal catalyst. Examples of such platinum group metal catalysts include platinum-based, palladium-based, rhodium-based and ruthenium-based catalysts. Of these, the use of a platinum-based catalyst is especially preferred. Examples of such platinum-based catalysts include chloroplatinic acid, alcohol solutions or aldehyde solutions of chloroplatinic acid, and complexes of chloroplatinic acid with various olefins or vinylsiloxanes.

These platinum group metal catalysts are added in a catalytic amount. In terms of economic considerations, the weight of the platinum group metal with respect to the combined amount of the alkenyl group-containing organopolysiloxane and the organohydrogenpolysiloxane is preferably in the range of 0.1 to 100 ppm, and more preferably in the range of 0.5 to 5 ppm.

Solvents that are preferably used for synthesizing the crosslinked organopolysiloxane in this invention include organic solvents that are soluble in organopolysiloxanes, such as toluene, hexane, xylene or methyl ethyl ketone (which organic solvents contain no siloxane solvent); low-viscosity cyclic siloxanes such as octamethyltetrasiloxane and decamethylpentasiloxane; linear siloxanes such as $M_2D_n$ (wherein M and D are as defined above; and n is an integer from 0 to 200, and preferably from 1 to 50); and branched siloxanes (siloxane solvents) such as $M_{2+m}D_nT_m$ (wherein M, D and T are as defined above; n is an integer from 0 to 200, and preferably from 1 to 50; and m is an integer from 1 to 10, and preferably from 1 to 3).

The amount of solvent used is at least 8 times, preferably at least 10 times and up to 50 times, and more preferably at least 12 times and up to 40 times, the combined weight of the organopolysiloxanes of formulas (1) and (2). When the amount of solvent used is too low, the molecular weight of the crosslinked organopolysiloxane may become too high, giving rise to gelling; on the other hand, when the amount of solvent used is too high, the molecular weight may become too small, as a result of which the organopolysiloxane may lack the properties of a crosslinked product and have instead properties close to those of an oil.

Because the reaction due to hydrosilylation proceeds slowly at normal temperature, the reaction temperature is preferably from 50 to 140° C., and more preferably from 60 to 120° C., and the reaction time is preferably 1 to 8 hours, and more preferably 2 to 5 hours.

The reaction can be confirmed by the amount of hydrogen gas generated. In terms of the remaining amount of SiH groups, this is preferably not more than 0.001 mol/100 g, and more preferably not more than 0.0001 mol/100 g. The amount of hydrogen gas generated is measured as the amount of hydrogen gas that evolves when a water-diluted aqueous alkaline solution is placed in about 10 g of sample.

The crosslinked organopolysiloxane obtained by this reaction has a weight-average molecular weight (Mn) of from 5,000 to 300,000,000, preferably from 5,000 to 12,000,000, and more preferably from 7,000 to 500,000. This range, expressed in terms of the average degree of polymerization, is preferably from 65 to 163,000, and more preferably from 90 to 6,760. The weight-average molecular weight can be determined as the polystyrene-equivalent weight-average molecular weight in gel permeation chromatographic (GPC) analysis (solvent: toluene). When the weight-average molecular weight is too large, molecular weight determination can be carried out by measurement using a TSKgel SuperHM-H column for ultrahigh molecular weight. The average degree of polymerization can be determined from the results of Si—NMR measurement (the same applies below).

The crosslinked organopolysiloxane obtained by the above reaction has a silethylene linkage content per 1,000 moles of siloxane units, as calculated from $^1$H-NMR measurement, of 0.1 to 50 moles, and preferably 1 to 30 moles. When the silethylene linkage content is too low, the organopolysiloxane becomes close in nature to an oil, and the characteristics of a crosslinked product are not obtained. On the other hand, when the content is too high, the viscosity becomes too high, which may make mixture difficult.

The crosslinked organopolysiloxane obtained as described above has a viscosity at 25° C., as measured using a Brookfield rotational viscometer, when 30 wt % is dissolved in a dimethylpolysiloxane having a kinematic viscosity of 20 mm²/s (25° C.), of preferably from 100 to 2,000,000 mPa·s, more preferably from 300 to 160,000 mPa·s, even more preferably from 500 to 100,000 mPa·s, and most preferably from 1,000 to 50,000 mPa·s. The viscosity, when 30 wt % is dissolved in toluene, is preferably from 50 to 1,000,000 mPa·s, more preferably from 100 to 130,000 mPa·s, even more preferably from 300 to 50,000 mPa·s, and most preferably from 500 to 10,000 mPa·s.

In this invention, the crosslinked organopolysiloxane may be used as a composition which includes, unchanged, the solvent used in the above reaction, in which case the composition contains no solid and is in the form of a uniform oil.

When synthesized using an organic solvent such as toluene, a composition that is free of organic solvent can be obtained by adding a low-viscosity organopolysiloxane as the solvent and subsequently heating under a reduced pressure so as to drive off the organic solvent by distillation. This method is effective particularly when using an alkenyl group-containing organopolysiloxane as the low-viscosity organopolysiloxane.

In this case, it is preferable to set the reduced-pressure conditions to from 0.01 to 50 mmHg, and especially from 0.1 to 30 mmHg, and to set the heating conditions to from 50 to 150° C. for 30 minutes to 5 hours, and especially to from 60 to 130° C. for 30 minutes to 3 hours.

The low-viscosity organopolysiloxane is preferably a compound having a structure of formula (3) below.

$$M_{\alpha'}M^{\overline{n}}{}_{\beta'}D_{\gamma'}D^{\overline{n}}{}_{\delta'}T_{\epsilon'}T^{\overline{n}}{}_{\zeta'} \quad (3)$$

In formula (3), M is $R_3SiO_{1/2}$, $M^{\overline{n}}$ is $R_2PSiO_{1/2}$, D is $R_2SiO_{2/2}$, $D^{\overline{n}}$ is $RPSiO_{2/2}$, T is $RSiO_{3/2}$ and $T^{\overline{n}}$ is $PSiO_{3/2}$. Here, each R is independently an unsubstituted or substituted monovalent hydrocarbon group of 1 to 12 carbon atoms that has no aliphatic unsaturated bonds, and is exemplified in the same way as above. Also, P is an alkenyl group represented by $-(CH_2)_a-CH=CH_2$ (where "a" is 0 or an integer from 1 to 6). The subscripts α', β', γ', δ', ε' and ζ' are each independently 0 or a positive number, with α'+β'+γ'+δ'+ε'+ζ'≤200, and preferably α'+β'+γ'+δ'+ε'+ζ'≤150.

Such low-viscosity organopolysiloxanes are exemplified by dimethylpolysiloxanes having a viscosity of 1 to 1,000 mPa·s, dimethylpolysiloxanes having dimethylvinylsiloxy groups at both ends of the molecular chain, methylvinylpolysiloxanes having pendant vinyl groups, dimethylpolysiloxanes having dimethylhydroxysilyl groups at both ends, and phenylmethylpolysiloxanes having pendant phenyl groups. Preferred examples include vinyl group-containing polysiloxanes such as $M^{\overline{n}}{}_2D_{10}$, $M^{\overline{n}}{}_2D_{100}$, $M_2D_{27}D^{\overline{n}}{}_3$, $M_2D_{97}D^{\overline{n}}{}_3$, $M_2D_{26}D^{\overline{n}}{}_4$, $M_2D_{25}D^{\overline{n}}{}_5$, $M_2D_{24}D^{\overline{n}}{}_6$, $M_2D_{96}D^{\overline{n}}{}_4$, $M_2D_{95}D^{\overline{n}}{}_5$, $M^{\overline{n}}{}_3D_{100}T_1$, $M^{\overline{n}}{}_4D_{100}T_2$, $M^{\overline{n}}{}_2D_{97}D^{\overline{n}}{}_1$, $M^{\overline{n}}{}_2D_{95}D^{\overline{n}}{}_3$ and $M_3D_{93}D^{\overline{n}}{}_3T^{\overline{n}}{}_1$.

The amount of the low-viscosity organopolysiloxane of formula (3) is preferably 0.1 to 40 times, more preferably 0.1 to 20 times, even more preferably 0.5 to 10 times, and most preferably 0.5 to 5 times, the weight of the crosslinked organopolysiloxane.

Applications for the crosslinked organopolysiloxane of the invention include silicone gels for use in cosmetics that have a soft feel and can be easily and inexpensively synthesized, molded bodies of siliconized plastics that are free of surface slipperiness, mist suppressants for suppressing mist generated during the high-speed application of silicones for release paper, and pressure-sensitive adhesives having excellent re-peelability.

EXAMPLES

Working Examples and Comparative Examples are given below to more concretely illustrate the invention, although the invention is not limited by these Examples. The viscosities mentioned below are all values measured at 25° C. using a Brookfield rotational viscometer.

The symbols used in the following Examples to indicate siloxane compositions denote the following units.

M: $(CH_3)_3SiO_{1/2}$
$M^H$: $(CH_3)_2HSiO_{1/2}$
$M^{Vi}$: $(CH_2=CH)(CH_3)_2SiO_{1/2}$
D: $(CH_3)_2SiO_{2/2}$
$D^H$: $(CH_3)HSiO_{2/2}$
$D^{Vi}$: $(CH_2=CH)(CH_3)SiO_{2/2}$
T: $(CH_3)SiO_{3/2}$
$T^{Vi}$: $(CH_2=CH)SiO_{3/2}$
Q: $SiO_{4/2}$

Working Example 1

The side chain-type methylhydrogenpolysiloxane denoted as $M_2D_{24.6}D^H{}_2$ (10 g) and 48 g of the branched vinylmethylpolysiloxane denoted as $M^{Vi}{}_{2.4}D_{147.7}T_{0.4}$ (SiH groups:vinyl groups=1 mole:1.083 moles) were mixed together in 696 g of toluene (corresponding to 12 times the total weight of the siloxanes), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups, based on the amount of generated hydrogen gas (the same applies below), was 0 mol/100 g.

The resulting reaction product had a viscosity of 5.4 mPa·s and a weight-average molecular weight of 52,000. The product obtained when toluene was removed by vacuum distillation had a viscosity of 8,000 mPa·s. When 30 wt % of this crosslinked product was dissolved in toluene, the viscosity was 110 mPa·s. When 30 wt % of the crosslinked product was dissolved in dimethylpolysiloxane having a kinematic viscosity of 20 mm²/s, the viscosity was 290 mPa·s. The amount of silethylene linkages per 1,000 moles of siloxane units, as determined by $^1$H-NMR analysis, was 11.1 moles.

Next, 696 g of the divinyl-terminated dimethylpolysiloxane denoted as $M^{Vi}{}_2D_{66.8}$ was added to the reaction product and 3 hours of vacuum distillation at 150° C. and 10 mmHg under nitrogen bubbling was carried out, giving a composition that was 100% siloxane.

Working Example 2

The side chain-type methylhydrogenpolysiloxane denoted as $M_2D_{24.6}D^H{}_2$ (10 g) and 48 g of the branched vinylmethylpolysiloxane denoted as $M^{Vi}{}_{2.4}D_{147.7}T_{0.4}$ (SiH groups:vinyl groups=1 mole:1.083 moles) were mixed together in 812 g of toluene (corresponding to 14 times the combined weight of the side chain-type methylhydrogenpolysiloxane and the branched vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0.00004 mol/100 g.

The resulting reaction product was an oil having a viscosity of 4.0 mPa·s, and had a weight-average molecular weight of 43,000. The product obtained when toluene was removed by vacuum distillation had a viscosity of 5,550 mPa·s. When 30 wt % of this crosslinked product was dissolved in toluene, the viscosity was 80 mPa·s. When 30 wt % of the crosslinked product was dissolved in dimethylpolysiloxane having a kinematic viscosity of 20 mm²/s, the viscosity was 230 mPa·s. The amount of silethylene linkages per 1,000 moles of siloxane units, as determined by $^1$H-NMR analysis, was 11.1 moles.

Next, 696 g of the dimethylpolysiloxane denoted as $M_2D_{27}$ was added to the reaction product and 3 hours of vacuum distillation at 150° C. and 10 mmHg under nitrogen bubbling was carried out, giving a composition that was 100% siloxane.

Working Example 3

The side chain-type methylhydrogenpolysiloxane denoted as $M_2D_{24.6}D^H{}_2$ (10 g) and 48 g of the branched vinylmethylpolysiloxane denoted as $M^{Vi}{}_{2.4}D_{147.7}T_{0.4}$ (SiH groups:vinyl groups=1 mole:1.083 moles) were mixed together in 696 g of the dimethylpolysiloxane denoted as $M_2D_{27}$ (corresponding to 12 times the combined weight of the side chain-type methylhydrogenpolysiloxane and the branched vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0 mol/100 g.

The resulting reaction product was an oil having a viscosity of 223 mPa·s and a weight-average molecular weight of 150,000. The viscosity of the crosslinked product, as estimated by calculation from the foregoing product viscosity, was 983,000 mPa·s. When 30 wt % of this crosslinked product was dissolved in toluene, the viscosity was 5,490 mPa·s. When 30 wt % of the crosslinked product was dissolved in dimethylpolysiloxane having a kinematic viscosity of 20 mm²/s, the viscosity was 8,700 mPa·s. The amount of silethylene linkages per 1,000 moles of siloxane units in the crosslinked component (exclusive of $M_2D_{27}$), as determined by $^1$H-NMR analysis, was 11.2 moles.

Working Example 4

The side chain-type methylhydrogenpolysiloxane denoted as $M_2D_{24.6}D^H{}_2$ (10 g) and 58.9 g of the di-terminated vinylmethylpolysiloxane denoted as $M^{Vi}{}_2D_{150}$ (SiH groups:vinyl groups=1 mole:1.097 moles) were mixed together in 696 g of the dimethylpolysiloxane denoted as $M_2D_{27}$ (corresponding to 12 times the combined weight of the side chain-type methylhydrogenpolysiloxane and the di-terminated vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0 mol/100 g.

The resulting reaction product was an oil having a viscosity of 240 mPa·s and a weight-average molecular weight of 130,000. The viscosity of the crosslinked product, as estimated by calculation from the foregoing product viscosity, was 590,000 mPa·s. When 30 wt % of this crosslinked product was dissolved in toluene, the viscosity was 3,500 mPa·s. When 30 wt % of the crosslinked product was dissolved in a dimethylpolysiloxane having a kinematic viscosity of 20 mm²/s, the viscosity was 5,800 mPa·s. The amount of silethylene linkages per 1,000 moles of siloxane units in the crosslinked component (exclusive of $M_2D_{27}$), as determined by $^1$H-NMR analysis, was 10.8 moles.

Working Example 5

The side chain-type methylhydrogenpolysiloxane denoted as $M_2D_{27}D^H_3$ (10 g) and 76.2 g of the di-terminated vinylmethylpolysiloxane denoted as $M^{Vi}_2D_{144}$ (SiH groups: vinyl groups=1 mole:1.069 moles) were mixed together in 1,034 g of the dimethylpolysiloxane denoted as $M_2D_{27}$ (corresponding to 12 times the combined weight of the side chain-type methylhydrogenpolysiloxane and the di-terminated vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0 mol/100 g.

The resulting reaction product was an oil having a viscosity of 970 mPa·s and a weight-average molecular weight of 300,000. The viscosity of the crosslinked product, as estimated by calculation from the foregoing product viscosity, was 17,000,000 mPa·s. When 30 wt % of this crosslinked product was dissolved in toluene, the viscosity was 73,400 mPa·s. When 30 wt % of the crosslinked product was dissolved in a dimethylpolysiloxane having a kinematic viscosity of 20 mm²/s, the viscosity was 96,600 mPa·s. The amount of silethylene linkages per 1,000 moles of siloxane units in the crosslinked component (exclusive of $M_2D_{27}$), as determined by $^1$H-NMR analysis, was 6.3 moles.

Working Example 6

The side chain-type methylhydrogenpolysiloxane denoted as $M_2D_{24}D^H_4$ (10 g) and 109.3 g of the di-terminated vinylmethylpolysiloxane denoted as $M^{Vi}_2D_{144}$ (SiH groups:vinyl groups=1 mole:1.069 moles) were mixed together in 1,670 g of the dimethylpolysiloxane denoted as $M_2D_{27}$ (corresponding to 14 times the combined weight of the side chain-type methylhydrogenpolysiloxane and the di-terminated vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0.00005 mol/100 g.

The resulting reaction product was an oil having a viscosity of 3,060 mPa·s and a weight-average molecular weight of 400,000. The viscosity of the crosslinked product, as estimated by calculation from the foregoing product viscosity, was 202,400,000 mPa·s. When 30 wt % of this crosslinked product was dissolved in toluene, the viscosity was 765,000 mPa·s. When 30 wt % of the crosslinked product was dissolved in a dimethylpolysiloxane having a kinematic viscosity of 20 mm²/s, the viscosity was 907,000 mPa·s. The amount of silethylene linkages per 1,000 moles of siloxane units in the crosslinked component (exclusive of $M_2D_{27}$), as determined by $^1$H-NMR analysis, was 6.5 moles.

Working Example 7

The di-terminated methylhydrogenpolysiloxane denoted as $M^H_2D_{40}$ (10 g) and 20 g of the side chain-type vinylmethylpolysiloxane denoted as $M_2D_{27}D^{Vi}_3$ (SiH groups:vinyl groups=1 mole:1.083 moles) were mixed together in 480 g of the dimethylpolysiloxane denoted as $M_2D_{27}$ (corresponding to 16 times the combined weight of the side chain-type methylhydrogenpolysiloxane and the di-terminated vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. When the reaction had been carried out 5 hours at a temperature of 80° C., the amount of remaining SiH groups was 0 mol/100 g.

The resulting reaction product was an oil having a viscosity of 2,320 mPa·s and a weight-average molecular weight of 440,000. The viscosity of the crosslinked product, as estimated by calculation from the foregoing product viscosity, was 238,000,000 mPa·s. When 30 wt % of this crosslinked product was dissolved in toluene, the viscosity was 1,053,000 mPa·s. When 30 wt % of the crosslinked product was dissolved in a dimethylpolysiloxane having a kinematic viscosity of 20 mm²/s, the viscosity was 893,600 mPa·s. The amount of silethylene linkages per 1,000 moles of siloxane units in the crosslinked component (exclusive of $M_2D_{27}$), as determined by $^1$H-NMR analysis, was 21 moles.

Comparative Example 1

The side chain-type methylhydrogenpolysiloxane denoted as $M_2D_{24.6}D^H_2$ (10 g) and 58.9 g of the di-terminated vinylmethylpolysiloxane denoted as $M^{Vi}_2D_{150}$ (SiH groups:vinyl groups=1 mole:1.097 moles) were mixed together without solvent dilution, following which a platinum catalyst having vinylmethylpolysiloxane coordinated thereto was added in an amount corresponding to a platinum weight of 2 ppm based on the total weight of the reaction system, and the temperature was raised. Gelling occurred at a temperature of about 60° C. The amount of remaining SiH groups was 0.005 mol/100 g.

Comparative Example 2

The side chain-type methylhydrogenpolysiloxane denoted as $M_2D_{24.6}D^H_2$ (10 g) and 48 g of the branched vinylmethylpolysiloxane denoted as $M^{Vi}_{2.4}D_{147.7}T_{0.4}$ (SiH groups:vinyl groups=1 mole:1.083 moles) were mixed together in 232 g of toluene (equivalent to 4 times the total weight of the siloxanes), following which a platinum catalyst having vinylmethylpolysiloxane coordinated thereto was added in an amount corresponding to a platinum weight of 2 ppm based on the total weight of the reaction system, and the temperature was raised. Gelling occurred at a temperature of about 70° C. The amount of remaining SiH groups was 0.007 mol/100 g.

Comparative Example 3

The side chain-type methylhydrogenpolysiloxane denoted as $M_2D_{24.6}D^H_2$ (10 g) and 48 g of the branched vinylmethylpolysiloxane denoted as $M^{Vi}_{2.4}D_{147.7}T_{0.4}$ (SiH groups:vinyl groups=1 mole:1.083 moles) were mixed together in 232 g of the dimethylpolysiloxane denoted by $M_2D_{27}$ (corresponding to 4 times the combined weight of the side chain-type methylhydrogenpolysiloxane and the branched vinylmethylpolysiloxane), following which a platinum catalyst having vinylmethylpolysiloxane coordinated thereto was added in an amount corresponding to a platinum weight of 2 ppm based on the total weight of the reaction system, and the temperature was raised. Gelling occurred at a temperature of about 70° C. The amount of remaining SiH groups was 0.003 mol/100 g.

The invention claimed is:

1. A method of preparing a siloxane composition, comprising:

a step of producing a crosslinked organopolysiloxane having a weight-average molecular weight of 5,000 to 300,000,000 and containing 0.1 to 50 moles of silethylene linkages per 1,000 moles of siloxane units by hydrosilylation of an organopolysiloxane having a structure of formula (1) below with an organohydrogenpolysiloxane having a structure of formula (2) below $$M_\alpha M^{Vi}_\beta D_\gamma D^{Vi}_\delta T_\epsilon T^{Vi}_\zeta Q_\eta \qquad (1)$$

$$M_\theta M^H_\iota D_\kappa D^H_\lambda T_\mu T^H_\nu \qquad (2)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha$, $\beta$, $\gamma$, $\delta$, $\epsilon$, $\zeta$, $\eta$, $\theta$, $\iota$, $\kappa$, $\lambda$, $\mu$ and $\nu$ are each independently 0 or a positive number, with the provisos that $\beta$, $\delta$ and $\zeta$ are not all 0, $\beta+\delta+\zeta\geq 2$, $\iota$, $\lambda$ and $\nu$ are not all 0, and $\iota+\lambda+\nu\geq 2$) in an amount of solvent that is at least 8 times the combined weight of the polysiloxanes of formulas (1) and (2) and using a platinum group metal compound, and after obtaining the crosslinked organopolysiloxane using an organic solvent selected from among toluene, hexane, xylene and methyl ethyl ketone as the solvent: adding a low-viscosity organopolysiloxane as a solvent, and distilling off the organic solvent by heating under reduced pressure so as to give a composition that contains no organic solvent.

2. The method of preparing a siloxane composition of claim 1, wherein the low-viscosity organopolysiloxane is an organopolysiloxane of the following formula (3)

$$M_{\alpha'} M^{Vi}_{\beta'} D_{\gamma'} D^{Vi}_{\delta'} T_{\epsilon'} T^{Vi}_{\zeta'} \qquad (3)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$ and $T^{Vi}$ is $PSiO_{3/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha'$, $\beta'$, $\gamma'$, $\delta'$, $\epsilon'$ and $\zeta'$ are each independently 0 or a positive number, with the proviso that $\alpha'+\beta'+\gamma'+\epsilon'+\zeta'\leq 200$).

3. A method of preparing a siloxane composition, comprising:

a step of producing a crosslinked organopolysiloxane having a weight-average molecular weight of 5,000 to 300,000,000 and containing 1 to 50 moles of silethylene linkages per 1,000 moles of siloxane units by hydrosilylation of an organopolysiloxane having a structure of formula (1) below with an organohydrogenpolysiloxane having a structure of formula (2) below $$M_\alpha M^{Vi}_\beta D_\gamma D^{Vi}_\delta T_\epsilon T^{Vi}_\zeta Q_\eta \qquad (1)$$

$$M_\theta M^H_\iota D_\kappa D^H_\lambda T_\mu T^H_\nu \qquad (2)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha$, $\beta$, $\gamma$, $\delta$, $\epsilon$, $\zeta$, $\eta$, $\theta$, $\iota$, $\kappa$, $\lambda$, $\mu$ and $\nu$ are each independently 0 or a positive number, with the provisos that $\beta$, $\delta$ and $\zeta$ are not all 0, $\beta+\delta+\zeta\geq 2$, $\iota$, $\lambda$ and $\nu$ are not all 0, and $\iota+\lambda+\nu\geq 2$) in an amount of solvent that is at least 8 times the combined weight of the polysiloxanes of formulas (1) and (2) and using a platinum group metal compound, and after obtaining the crosslinked organopolysiloxane using an organic solvent selected from among toluene, hexane, xylene and methyl ethyl ketone as the solvent: adding a low-viscosity organopolysiloxane as a solvent, and distilling off the organic solvent by heating under reduced pressure so as to give a composition that contains no organic solvent.

4. The method of preparing a siloxane composition of claim 3, wherein the low-viscosity organopolysiloxane is an organopolysiloxane of the following formula (3)

$$M_{\alpha'} M^{Vi}_{\beta'} D_{\gamma'} D^{Vi}_{\delta'} T_{\epsilon'} T^{Vi}_{\zeta'} \qquad (3)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$ and $T^{Vi}$ is $PSiO_{3/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha'$, $\beta'$, $\gamma'$, $\delta'$, $\epsilon'$ and $\zeta'$ are each independently 0 or a positive number, with the proviso that $\alpha'+\beta'+\gamma'+\delta'+\epsilon'+\zeta'\leq 200$).

* * * * *